(No Model.)
J. M. HARTMAN.
PYROMETER.
No. 543,550. Patented July 30, 1895.
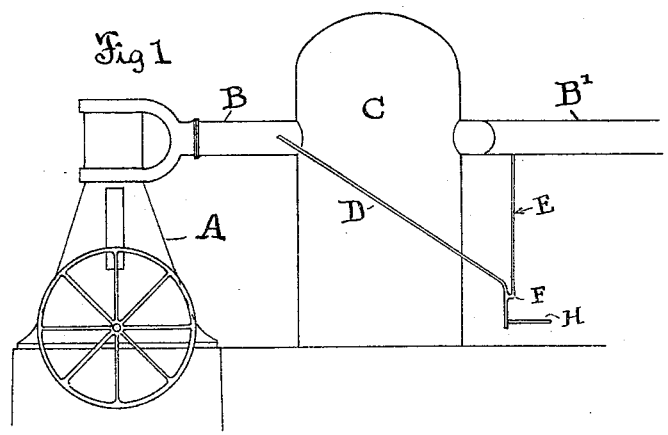
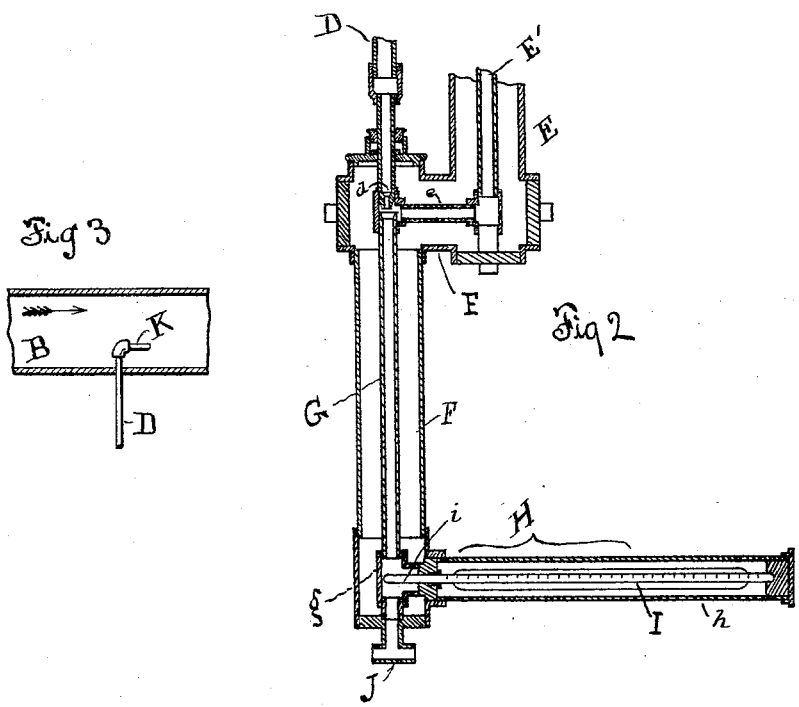
WITNESSES:
INVENTOR

UNITED STATES PATENT OFFICE.

JOHN M. HARTMAN, OF PHILADELPHIA, PENNSYLVANIA.

PYROMETER.

SPECIFICATION forming part of Letters Patent No. 543,550, dated July 30, 1895.

Application filed May 8, 1893. Serial No. 473,464. (No model.)

*To all whom it may concern:*

Be it known that I, JOHN M. HARTMAN, of the city of Philadelphia and State of Pennsylvania, have invented certain new and useful Improvements in Pyrometers, whereof the following is a specification, reference being had to the accompanying drawings.

My invention is especially adapted for use in connection with hot-blast stoves for iron furnaces, but can be made available under any circumstances where it is desired to ascertain the temperature of a heated current whose pressure is liable to vary. As heretofore constructed pyrometers of this class have consisted of a thermometer or other indicator, in combination with a pipe communicating with the hot-blast pipe and provided with an intake open to the outside air, whereby the hot current was diluted by admixture with a large volume of air drawn in under ordinary atmospheric pressure. As the pressure of the hot blast, whose temperature is to be ascertained, is liable to vary from time to time, the amount of dilution obtained by this device is also subject to great variations, thus rendering it impossible to predicate accurately the proper coefficient of dilution whereon to base the necessary calculation for obtaining the temperature of the hot blast itself. To overcome these difficulties, I combine with the thermometer and with the pipe which leads the hot blast thereto a pipe for cold air communicating with the initial source of pressure at a point anterior (in the course of the current) to the heating apparatus proper. Thus any variation of pressure which would tend to increase or diminish the hot current will occur substantially at the same time and in the same manner in the diluting current and a constant relation will be preserved between the two currents.

In the accompanying drawings, Figure 1 represents, diagrammatically, the apparatus in connection with an ordinary hot-blast stove and a blowing-engine. Fig. 2 is a sectional view through the pyrometer proper, showing partially the immediate connections with the hot and cold blasts, respectively. Fig. 3 is a horizontal section through the cold-blast pipe, showing the inlet end of the pipe through which the cold or diluted current is transmitted.

The blowing-engine is indicated by A, whence the cold-blast or inlet pipe B leads to the stove C, said stove being provided with an exit-pipe B' for conducting the hot blast to the furnace.

The pyrometer proper is indicated in Fig. 1 by H, and consists of a thermometer I, inclosed by a projecting casing $h$, and having a bulb or end $i$, which extends into a chamber $g$ for exposure to the diluted current.

A hot-air pipe E', surrounded by a jacket E, with an interspace for packing leads from the hot-blast or exit pipe B' to a point in proximity to the pyrometer and communicates by means of a branch $e$ with the mouth of a conduit G, leading to the chamber $g$, in which the bulb of the thermometer is exposed. The chamber $g$ has an outlet J leading to the open air.

A cold-air or diluting pipe D leads from the cold-blast or inlet pipe B to the point of communication between the branch $e$ and the conduit G, and is there provided with a jet or nozzle $d$, discharging directly into said conduit G, and adapted to induce and lead a current from said branch $e$ into said conduit G. The branch, nozzle, and adjacent devices are inclosed in a projecting casing F, which is prolonged downwardly to and surrounds the chamber $g$.

The relative dimensions of the pipes D and E and the adjustment of the nozzle with reference thereto is of course predetermined to effect any desired ratio of dilution.

The inlet end of the diluting-pipe D where it communicates with the cold-blast pipe B may be arranged as shown in Fig. 3, where it will be seen that said pipe after entering the pipe B turns and is projected a short distance, as shown at K, in the direction of the current, so that the opening of said pipe does not face the blast. The purpose of this method of construction is to equalize the currents through the pipes D and E' in case the area of the pipe B is too small as compared with that of the pipe B'.

The operation of the device is as follows: Blast being on the stove C, hot air is conducted through the pipe E' and cold air through the pipe D to the point of commingling, whence the diluted blast is transmitted through the conduit G and into the chamber $g$.

As the initial source of pressure is the same for both the hot and the diluting currents, any variation at said initial point will affect them both in substantially the same manner, and thus the object of the invention above referred to will be attained. The diluted hot current after passing by the bulb of the thermometer escapes at the outlet J.

In the foregoing specification and in my claims I use the term "thermometer" to indicate broadly the apparatus for exhibiting the temperature of the diluted blast; but it must be understood that I do not limit myself to the use of the specific device shown, nor do I limit myself to the use of the apparatus in connection with a hot-blast stove, as it may be applied to other purposes where the temperature of a heated current is to be obtained.

Having thus described my invention, I claim—

1. The combination of a thermometer; a conduit leading thereto; a blast-producing apparatus; a blast-heating apparatus communicating therewith; a hot air pipe communicating with the exit of the blast heating apparatus and leading to said conduit; and a diluting pipe also leading to said conduit, but communicating with the blast-producing apparatus at a point in advance of the blast-heating apparatus, substantially as set forth.

2. The combination of a thermometer; a chamber inclosing the exposed portion thereof; a conduit communicating with said chamber; a blast-producing apparatus; a blast-heating apparatus; inlet and outlet pipes for said blast-heating apparatus; a hot air pipe leading from said outlet pipe to a point of communication with said conduit; a diluting pipe leading from said inlet pipe to said conduit; and a nozzle interposed between said diluting pipe and said conduit at the point of communication of the hot air pipe therewith; substantially as set forth.

3. The combination of a thermometer; a chamber inclosing the exposed portion thereof; a conduit communicating with said chamber; a blast-producing apparatus; a blast-heating apparatus; inlet and outlet pipes for said blast-heating apparatus; a hot air pipe leading from said outlet pipe to a point of communication with said conduit; a diluting pipe leading from said inlet pipe to said conduit; said diluting pipe being projected within the inlet pipe in the direction of the current, substantially as set forth.

JOHN M. HARTMAN.

Witnesses:
G. HERBERT JENKINS,
JAMES H. BELL.